United States Patent
Pendse

(10) Patent No.: US 9,821,751 B2
(45) Date of Patent: Nov. 21, 2017

(54) AIRBAG MODULE

(71) Applicant: TK Holdings Inc., Auburn Hills, MI (US)

(72) Inventor: Nachiket C. Pendse, Northville, MI (US)

(73) Assignee: TK Holdings Inc., Auburn Hills, MI (US)

(*) Notice: Subject to any disclaimer, the term of this patent is extended or adjusted under 35 U.S.C. 154(b) by 0 days.

(21) Appl. No.: 15/085,732

(22) Filed: Mar. 30, 2016

(65) Prior Publication Data

US 2017/0282840 A1    Oct. 5, 2017

(51) Int. Cl.
| | | |
|---|---|---|
| *B60R 21/233* | (2006.01) | |
| *B60R 21/239* | (2006.01) | |
| *B60R 21/2338* | (2011.01) | |

(52) U.S. Cl.
CPC .......... *B60R 21/233* (2013.01); *B60R 21/239* (2013.01); *B60R 21/2338* (2013.01); *B60R 2021/23382* (2013.01); *B60R 2021/23386* (2013.01)

(58) Field of Classification Search
CPC . B60R 21/233; B60R 21/2338; B60R 21/239; B60R 2021/23382; B60R 2021/23386
See application file for complete search history.

(56) References Cited

U.S. PATENT DOCUMENTS

| | | | |
|---|---|---|---|
| 5,927,748 A | 7/1999 | O'Driscoll | |
| 6,158,765 A | 12/2000 | Sinnhuber | |
| 6,308,893 B1 | 10/2001 | Waxelbaum et al. | |
| 6,439,605 B2 | 8/2002 | Ariyoshi | |
| 6,554,313 B2 | 4/2003 | Uchida | |
| 7,347,445 B2 | 3/2008 | Choi | |
| 7,513,524 B2* | 4/2009 | Oota | B60R 21/18 280/733 |
| 7,654,561 B2 | 2/2010 | Webber et al. | |
| 7,938,445 B2 | 5/2011 | Smith et al. | |
| 7,946,613 B2* | 5/2011 | Rose | B60R 21/2338 280/729 |
| 8,282,122 B2 | 10/2012 | Marable et al. | |

(Continued)

FOREIGN PATENT DOCUMENTS

| | | |
|---|---|---|
| DE | 2 109 637 A1 | 9/1972 |
| DE | 199 14 214 A1 | 10/2000 |

(Continued)

*Primary Examiner* — Drew J Brown
(74) *Attorney, Agent, or Firm* — Gordon Rees Scully Mansukhani, LLP

(57) ABSTRACT

An airbag module for protecting an occupant of a vehicle. The airbag includes first and second inflatable chambers. Each of the first and second inflatable chambers is formed by separate front and back panels. Each of the front panels is connected to one of the back panels along a peripheral seam. The airbag is assembled by overlaying the panels on top of each other creating a simple two-dimensional structure for assembly. An inflator is provided for supplying inflation gas to the first chamber of the airbag. The first and second inflatable chambers are connected by a gas flow passage so that gas for inflating the second chamber can flow from the first chamber through the gas flow passage into the second chamber.

20 Claims, 5 Drawing Sheets

(56) References Cited

U.S. PATENT DOCUMENTS

| | | | | |
|---|---|---|---|---|
| 9,533,652 B1 * | 1/2017 | Paxton | ................ | B60R 21/239 |
| 2002/0005633 A1 * | 1/2002 | Amamori | .............. | B60R 21/233 |
| | | | | 280/729 |
| 2003/0094794 A1 * | 5/2003 | Amamori | .............. | B60R 21/231 |
| | | | | 280/729 |
| 2011/0101660 A1 * | 5/2011 | Schneider | ............ | B60R 21/206 |
| | | | | 280/731 |
| 2011/0140399 A1 * | 6/2011 | Kuhlmann | ............ | B60R 21/205 |
| | | | | 280/730.2 |
| 2015/0158452 A1 | 6/2015 | Choi et al. | | |
| 2015/0258959 A1 * | 9/2015 | Belwafa | ................ | B60R 21/233 |
| | | | | 280/729 |
| 2016/0001735 A1 * | 1/2016 | Quatanens | ............ | B60R 21/233 |
| | | | | 244/121 |

FOREIGN PATENT DOCUMENTS

| | | | |
|---|---|---|---|
| EP | 1 318 052 A1 | 11/2002 | |
| JP | 2007-131238 A | 5/2007 | |
| JP | 2010241416 A * | 10/2010 | ........... B60R 21/233 |
| WO | WO 2010/101673 A1 | 9/2010 | |
| WO | WO 2014/054478 A1 | 4/2014 | |

* cited by examiner

AIRBAG MODULE

BACKGROUND

The present application is directed to an airbag module including a stored airbag or cushion and an inflator. The module may be located in a position to deploy into the passenger compartment of a vehicle in order to protect the occupant during a crash event. The airbag may include various inflatable chambers to ensure that the airbag provides appropriate cushioning, energy absorption, and other desirable protective features.

The present application discloses several embodiments of an airbag module that provides for the benefits discussed above.

BRIEF DESCRIPTION OF THE DRAWINGS

Features, aspects, and advantages of the present invention will become apparent from the following description, appended claims, and the accompanying exemplary embodiments shown in the drawings, which are briefly described below.

DETAILED DESCRIPTION

Figure 1:
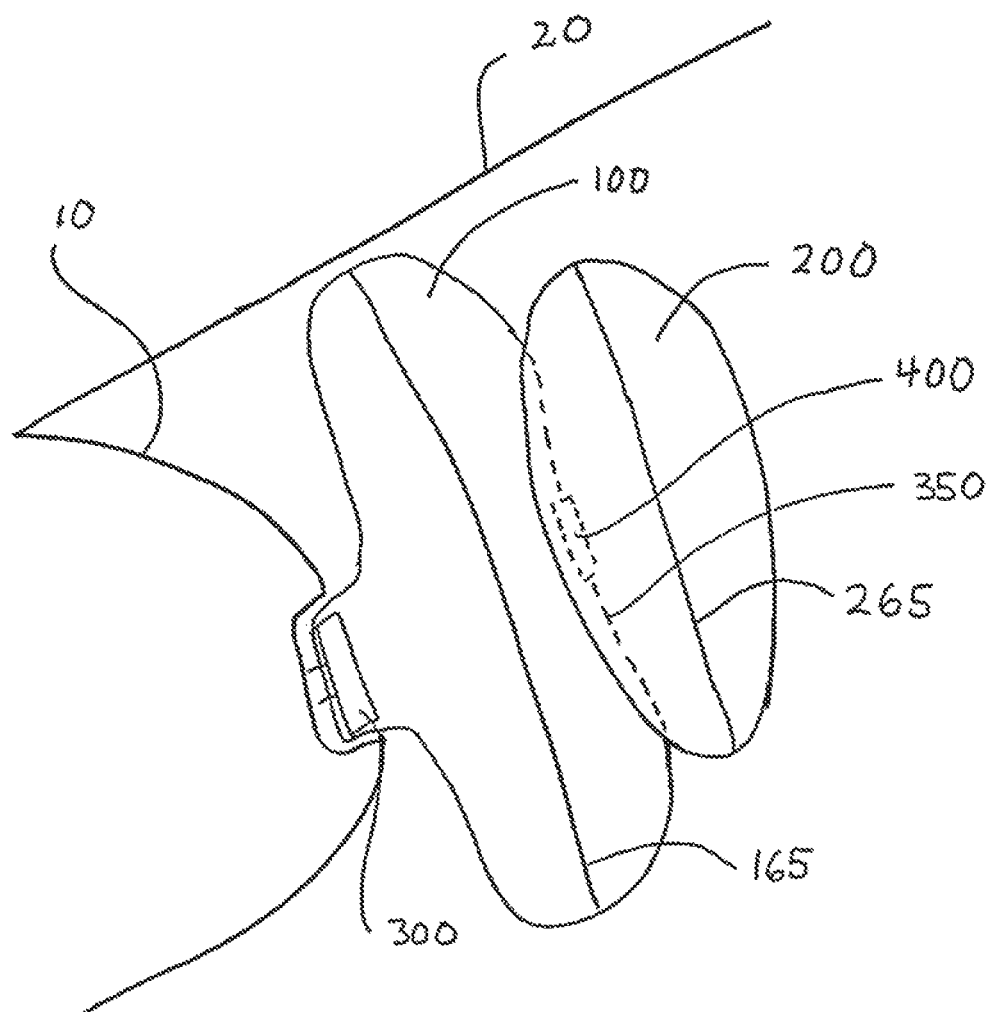
FIG. 1 is a side view of an airbag module with a deployed airbag including main and secondary airbags.

Various features of the present invention will be described with reference to the drawings. Like numbers are used throughout the drawings to refer to the same or similar parts and in each of the embodiments of the invention hereafter described.

As described herein and shown in the drawings, an airbag module is configured to protect an occupant of a vehicle. The airbag module may be positioned to protect a vehicle passenger. The airbag module includes an inflator and airbag. The inflator provides inflation gas for inflating the airbag and may be, for example, a pyrotechnic, stored gas or hybrid inflator. The airbag includes multiple inflatable chambers and is configured to deploy into a position to absorb collision related forces and mitigate potential injury to an occupant of the vehicle in the event of full frontal, offset frontal or oblique frontal crash of the vehicle.

The module may be configured to provide inflatable support for belted, unbelted and out of position occupants by providing collision energy mitigation. The module may be mounted in an instrument panel of the vehicle or in an alternate or substitute structure positioned in front of the occupant. The airbag includes a cushion with two inflatable chambers. As shown in the figures, the chambers may correspond to substantially two cushions stitched together. Each of the two cushions is a two dimensional type cushion formed from two overlaying panels of material. The inflator will provide inflation gas to inflate the first chamber before the second chamber. The chambers may be separated by a check valve or check valves or other mechanism which allow gases to flow from the first chamber into the second chamber. Preferably, the chambers are separate so that the front and back panels of the first chamber do not form of the boundary of the second chamber.

The deployment of the airbag may be triggered by a signal received from a crash sensor in the same manner as a conventional front airbag. For example, the inflator may be triggered by a signal received from an electronic control unit (ECU) that receives an input from a crash sensor or sensors. The folded airbag will inflate and causing a cover of the airbag module to open or break away allowing the airbag to deploy into the passenger chamber of the vehicle. Prior to inflation the airbag is folded in the airbag module.

When the inflator is initiated, gas starts flowing into the first chamber causing the airbag to unfold, inflate and deploy. As the first chamber inflates, a valve or a similar gas throttling mechanism opens and allows the gases to escape the main or primary first chamber into a second chamber. As the inflation device continues to release the gas which fills the chambers, both chambers of the cushion inflate in front of the passenger. As these chambers inflate, trajectory of the entire cushion may be controlled or constrained by tethers or similar mechanisms installed inside or external to the primary chamber and/or secondary chamber. Such tethers or similar mechanisms control the extension of cushion towards the occupant and/or facilitate smooth flow of gases into different sections of the cushion resulting into a desired inflation pattern or inflation trajectory.

The cushion is considered to be in position when all chambers of the cushion are completely unfolded and filled with gases from the inflation device and cushion is positioned in front of the occupant ready for collision energy mitigation. Once in position or even during the process of being inflated into position, the cushion or part of cushion may interact with the occupant. This interaction may be controlled by the tether configurations in the primary and/or secondary chamber. Both of these chambers may include vent holes or similar mechanisms which allow gas to escape from chambers into the atmosphere. The size; quantity and location of these vents may be adjusted to match the vehicle configuration and desired performance of the airbag. The energy absorption characteristics of the cushion may be controlled by controlling the length and/or design of the tethers earlier mentioned as well as size, quantity and location of these vents located on each chamber. Each of the chambers of the cushion may be vented or non-vented in order to support desired crash energy mitigation.

The airbag is configured to maintain the panels forming the airbag in two dimensional frames of reference during assembly of the airbag (e.g., stitching of the panels). Preferably, the airbag is configured to be assembled in a two dimensional arrangement wherein the front and back panels of the first and second chamber can be laid flat on top of adjacent panel for sewing adjacent panels together. In either of the chambers, panels may be flat or pleated to match the desired volume distribution during and/or after inflation. All the panels including tethers may be laid flat before stitching begins. The airbag may include a variety of shapes of two chambers or cushions sewn over each other. These two cushions can be of different or similar in shape, size or orientation. External stitches or external tethers may be employed to support the stability of chambers during and after inflation.

The airbag provides a unique frontal protection inflatable device using a combination of multiple stitched cushions or multi-chambered geometry, mounting, internal and/or external tethering and chambered venting to support occupant's crash energy. This unique cushion provides differential energy absorption for different classes of occupants based on their belted or non-belted status. The unique arrangement of the cushion allows the same basic configuration to be used for different vehicles due to the ability of airbag to be adjusted by varying the parameters of the cushion (e.g., venting, tethering, panel size and shape, etc.). The cushion may also be used for the protection of second, third or fourth row occupants. Mounting locations will vary based on design of seating position and interior support structures for device mounting. Inflator attachment location in the primary chamber may be varied to address the use of the cushion in either $1^{st}$, $2^{nd}$, $3^{rd}$, or $4^{th}$ row occupant protection.

As described generally above, and as shown in FIG. 1 according to a specific exemplary embodiment, the airbag module may include an inflator 300 and an airbag or cushion. The airbag or cushion may include a primary or main cushion 100 and a secondary cushion 200. The airbag module is configured to be mounted in an instrument panel 10 of a vehicle and deploy into a position against the windshield 20 of the vehicle. The primary and second cushions are connected along a seam and the airbag includes a passage to allow gas to flow from the primary cushion 100 into the secondary cushion 200. The flow of gas through the passage may be controlled by a valve 400. The valve 400 may be configured to permit the one directional flow of gas from the primary chamber or cushion 100 to the secondary chamber or cushion 200. Thus, the valve 400 may preferably be configured as a check valve.

Figure 2:
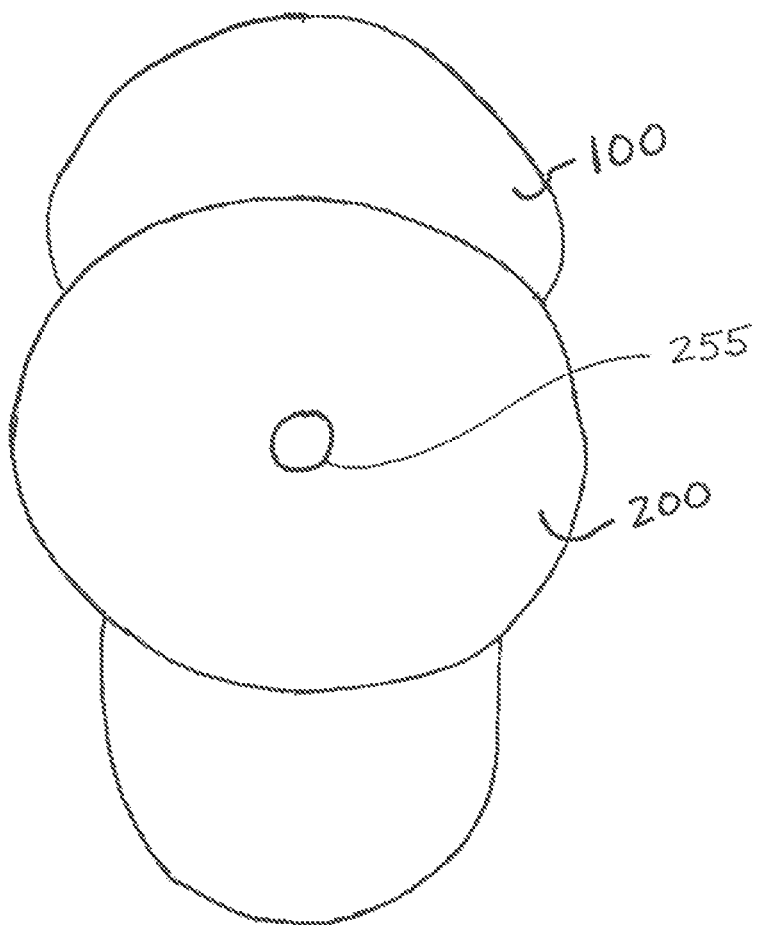
FIG. 2 is a front plan view of the airbag of FIG. 1.

Each of the connected primary and secondary cushions 100, 200 may be constructed as a two-dimensional airbag including two panels connected together along peripheral seams 165, 265. As shown in FIG. 2, the connected cushions 100, 200 provide an inflated volume for absorbing energy from an occupant of the vehicle in the case of crash involving the vehicle. The shape of the panels may be adjusted in order to change the volume and configuration of the inflated airbag.

Figure 3:
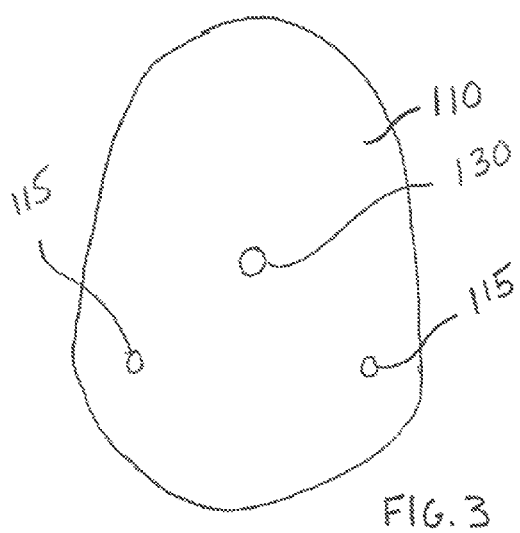
FIG. 3 is a plan view of one panel of the airbag of FIG. 1.
Figure 5:
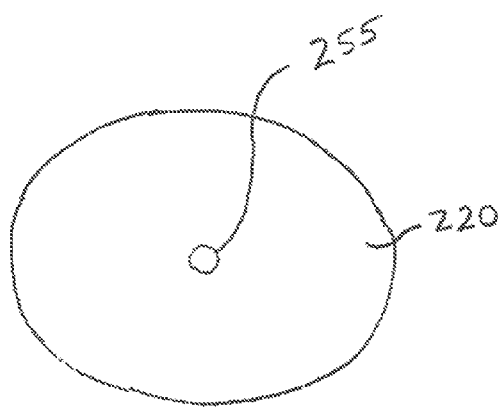
FIG. 5 is a plan view of a third panel of the airbag of FIG. 1.
Figure 4:
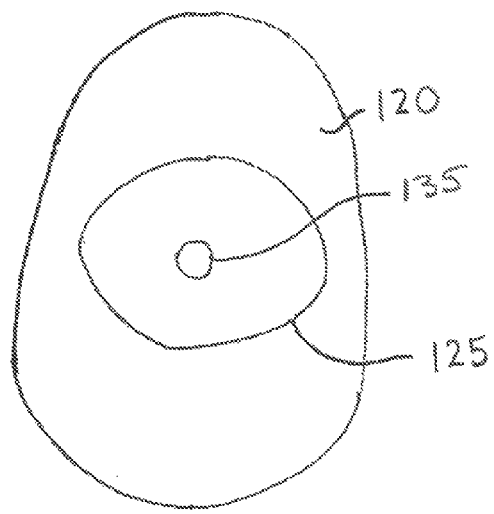
FIG. 4 is a plan view of a second panel of the airbag of FIG. 1.

The primary and second cushions may each be formed from separate fabric panels. As shown in FIGS. 3-6, each of the cushions is preferably formed from two connected panels. The primary cushion 100 includes a back panel 110 and a front panel 120. The back and front panels are connected together by a peripheral seam. The back panel includes an opening 130 for the inflator to be positioned inside the panel or for receiving inflation gas. The primary cushion may include one or more vent openings 115 which may, for example, be located in the back panel 110 as shown in FIG. 3. As shown in FIGS. 3-6, each front panel is symmetrical to its corresponding back panel.

Figure 6:
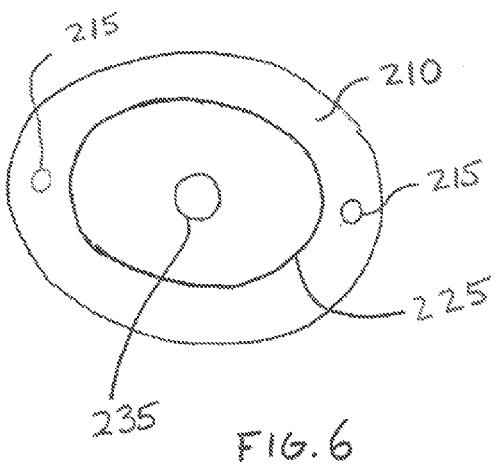
FIG. 6 is a plan view of a fourth panel of the airbag of FIG. 1.

The secondary cushion 200 includes a front panel 220 and a back panel 210. The panels are connected together by a peripheral seam. The back panel 210 includes an opening 235 for receiving inflation gas from the inflator via the primary cushion or chamber 100. The back panel 210 is connected to the front panel 120 by a seam 350 located along a closed line 225, which matches a similar line or curve 125 located on the front panel 120 of the primary cushion. As shown in the figures, the seam 350 is a non-peripheral seam located away from the edges of the panels. The seam 350 is closed by extending along a closed curve around the gas passage between the first and second chambers or cushions. The front panel 120 of the primary cushion 100 includes an opening 135 that matches or corresponds to the opening 235 in the back panel 210 of the second cushion 200. A seam may be provided to connect the panels 120, 210 around the gas passage or openings 135, 235. The secondary cushion or chamber 200 may include one or more vent openings 215 which may, for example, be located in the back panel 210 as shown in FIG. 6.

Figure 7:
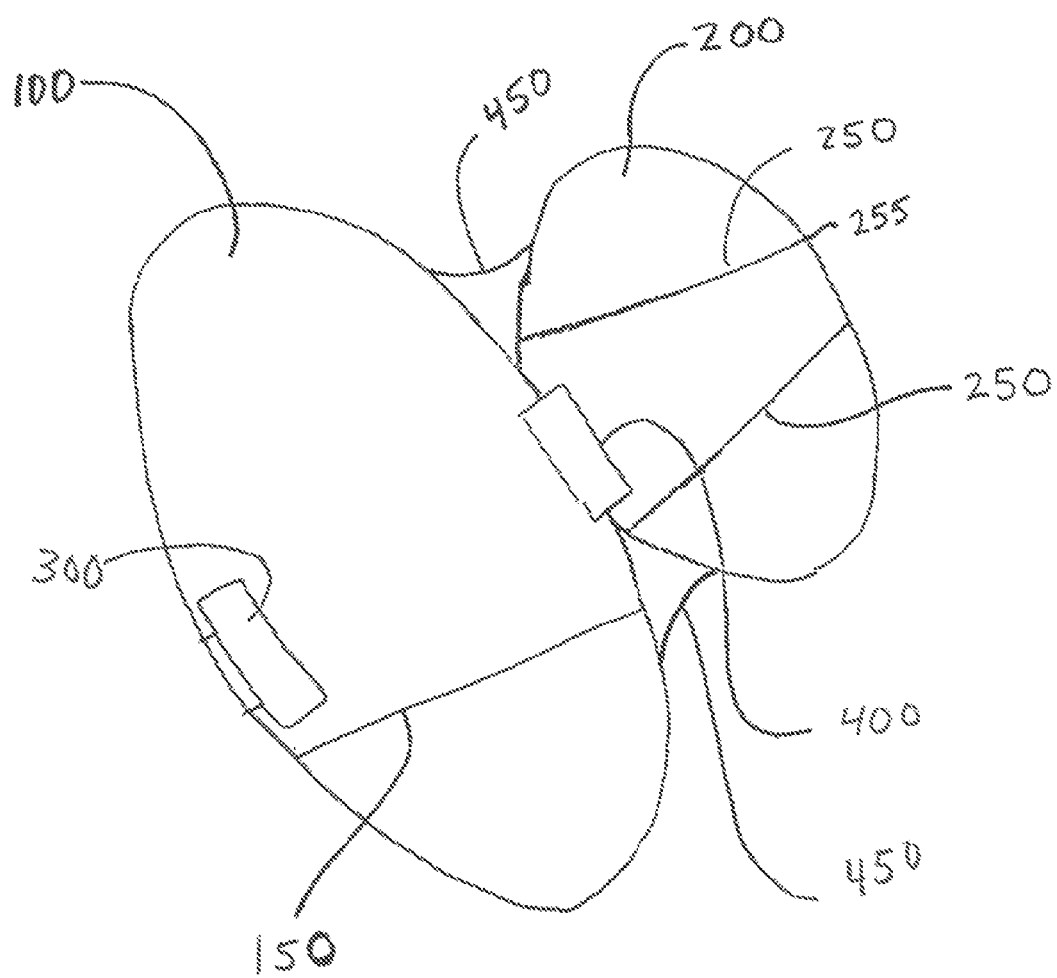
FIG. 7 is a side view of the airbag of FIG. 1 showing the internals of the airbag and optional tethering.

As shown in FIG. 7, the airbag may include tethers for controlling the deployment of the airbag. For example, the secondary airbag or cushion 200 may include internal tethers 250 connected to the back and front panels 210, 220. The primary cushion 100 may include an internal tether 150. The cushions or chambers 100, 200 may also be connected together by one or more external tethers 450. The tethers may be formed by bands or strips of fabric, for example. The pair of tethers 250, shown in FIG. 7 may be formed by a single sheet or strip that is connected to the front panel 220 by a seam 255 shown in FIGS. 2 and 5, for example.

As shown in FIG. 7, a gas control valve 400 may be positioned between the cushions 100, 200. The valve may be formed of a flap of material that opens when the pressure in the first or primary cushion 100 exceeds the pressure in the second chamber 200. When the second chamber is inflated and/or when the second chamber is contacted by the occupant in the case of a crash event, the pressure in the second chamber is equal to or greater than the pressure in the first chamber and the valve 400 closes to prevent gas to flow from the secondary chamber or cushion into the primary chamber. The valve 400 may function as a check valve to only allow gas to flow in one direction from the first chamber to the second chamber.

The check valve 400 is shown in FIG. 7 generically, but the check valve 400 be constructed in any of a variety of acceptable configurations. For example, U.S. Pat. Nos. 4,360,223 and 6,152,481 disclose exemplary check valve configurations that would be suitable for the exemplary embodiments of the airbag disclosed herein. These two patents are incorporated by reference herein in their entireties.

Figure 8:
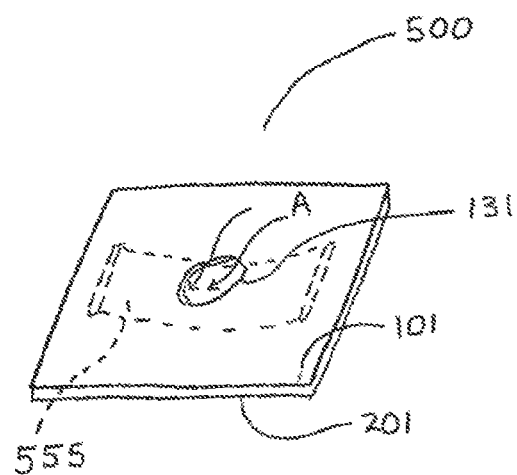
FIG. 8 is a view of an embodiment of a valve controlling flow between main and secondary airbags.

As described herein, the valve 400 may be a unidirectional valve that is configured to only allow gas flow from the primary cushion into the secondary cushion. However, the valve 400 may be configured to allow flow to occur in two directions. The primary flow direction would be from the primary cushion into the secondary cushion, but a secondary flow direction would be a reverse flow direction from the secondary cushion into the primary cushion in a situation such as, for example, occupant loading of the secondary cushion. A specific example of a flow control valve 500 is shown in FIG. 8. The valve is formed at the boundary between the primary and secondary cushion. At the boundary, a panel 101 of the primary cushion 100 overlies a panel 201 of the secondary cushion.

Overlying openings in the panels form a flow passage for gas to move from the primary cushion 100 to the secondary cushion 200. For example, the primary cushion panel 101 includes an opening 131 that overlies a similarly sized opening in the panel 201 forming the boundary of the secondary cushion. The primary flow direction A is from the primary cushion 100 to the secondary cushion 200. The opening is covered by a small strip or panel 555. The covering panel 555 is positioned on the secondary cushion side of the opening so that pressure of gas in the primary cushion 100 will force the strip 555 away from the opening and allow gas to flow from the primary cushion 100 into the secondary cushion.

In one configuration, when pressure in the secondary cushion 200 exceeds the pressure in the primary cushion 100, the strip 555 will cover the opening and prevent any reverse flow of gas from the secondary cushion 200 to the primary cushion 100. However, in another configuration the strip or panel 555 may be sized to permit some amount of reverse flow from the secondary cushion to the primary cushion so that the valve 500 functions as a bi-directional flow valve. For example, the strip 555 may be sized to allow a portion of the opening to be uncovered and allow some restricted reverse flow through the opening.

Figure 9:
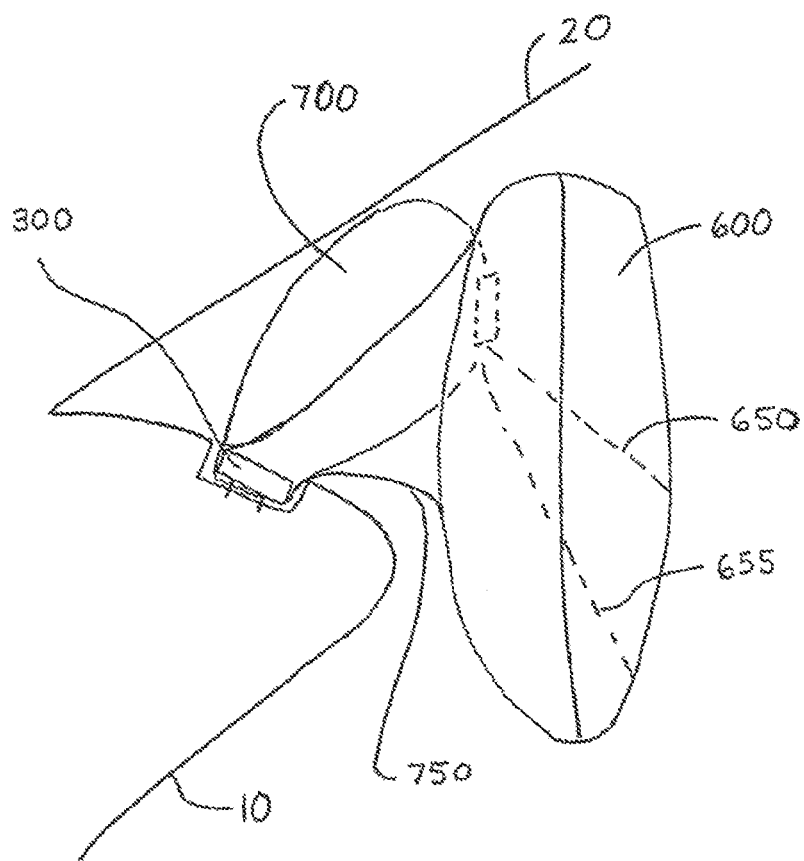
FIG. 9 is a side view of an alternative embodiment of an airbag module with a deployed airbag that includes main and secondary airbags.

The two chamber or cushion airbag disclosed herein may be configured in several different alternative configurations. For example, as shown in FIG. 9, the airbag module includes a top mounted inflator 300 and secondary cushion 600 connected to a side of a primary cushion 700. The secondary cushion 600 deploys into a position rearward of the main or primary cushion 700. The primary cushion 700 provides support for the secondary cushion 600 by deploying into a position between the instrument panel 10 and the windshield 20. The airbag may include tethers for assisting the deployment of the airbag into the proper position. For example, an external tether 750 may be provided to control the deployment position of the secondary cushion 600 relative to the smaller primary cushion 700. Also, the secondary cushion 600 may include internal tethers 650, 655 to control the deployment position of the cushion.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "fore," "aft,", "inboard", "outboard", "back," "front," etc.) are merely used to describe the orientation of various elements in the figures. It should be noted that the orientation of various elements may differ according to other exemplary embodiments, and that such variations are intended to be encompassed by the present disclosure.

The construction and arrangement of the airbag shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module configured to be mounted in an instrument panel of a vehicle for protecting an occupant of the vehicle comprising:
   an airbag including first and second inflatable chambers;
   wherein each of the first and second inflatable chambers is formed by separate front and back overlying panels,
   wherein each of the front panels is connected to one of the back panels along a peripheral seam, and wherein the front panel of the first chamber is connected to the back panel of second chamber along a non-peripherally located seam; and
   an inflator for providing inflation gas for the airbag;
   wherein the first and second inflatable chambers are connected by a gas flow passage, and wherein the airbag is configured so that all of the inflation gas entering the second chamber passes through the first chamber;
   wherein the back panel of the first inflation chamber includes an opening for allowing inflation gas to be provided to the airbag, and wherein the second chamber deploys to a position adjacent the occupant not in contact with the windshield and wherein the first chamber deploys to a position between the second chamber and the windshield to thereby provide support for the second inflatable chamber by contacting the windshield;
   and wherein a check valve is located in the gas flow passage.

2. The airbag module of claim 1, wherein each of the front panel of the first chamber and the back panel of the second chamber includes an opening forming the gas flow passage.

3. The airbag module of claim 1, wherein front panel and the back panel of the first chamber are connected by a tether located on the interior of the chamber.

4. The airbag module of claim 1, wherein the front panel and the back panel of the second chamber are connected by a tether located on the interior of the second chamber.

5. The airbag module of claim 1, wherein the first chamber and the second chamber are connected together by a tether located externally to the airbag.

6. The airbag module of claim 5, wherein the tether is connected to the front panel of the first chamber and the back panel of the second chamber.

7. The airbag module of claim 1, wherein the airbag is configured to be assembled in a two dimensional arrangement wherein the front and back panels of the first and second chamber can be laid flat on top of adjacent panel for sewing adjacent panels together.

8. An airbag module configured to be mounted in an instrument panel of a vehicle for protecting an occupant of the vehicle comprising:
   an airbag including first and second inflatable chambers;
   wherein each of the first and second inflatable chambers is formed by separate front and back panels,
   wherein each of the front panels is connected to one of the back panels along a peripheral seam, and wherein the front and back panels of the first chamber do not form of a boundary of the second chamber; and
   an inflator for providing inflation gas for the first chamber of the airbag;
   wherein the first and second inflatable chambers are connected by a gas flow passage so that gas for inflating the second chamber can flow from the first chamber through the gas flow passage into the second chamber; and
   wherein the first inflation chamber includes an opening for allowing inflation gas to be provided to the airbag, and wherein the second chamber deploys to a position adjacent the occupant not in contact with the windshield and wherein the first chamber deploys to a position between the second chamber and the windshield to thereby provide support for the second inflatable chamber by contacting the windshield.

9. The airbag module of claim 8, wherein the size and shape of the front and back panels of the first chamber are the same.

10. The airbag module of claim 9, wherein the size and shape of the front and back panels of the second chamber are the same.

11. The airbag module of claim 8, wherein the front panel of the first chamber is connected to the back panel of second chamber along a non-peripherally located seam.

12. The airbag module of claim 8, and wherein a check valve is located in the gas flow passage.

13. The airbag module of claim 8, wherein at least one of the first and second chambers include vent openings to allow gas to escape the airbag.

14. The airbag module of claim 8, wherein front panel and the back panel of the first chamber are connected by a tether located on the interior of the chamber.

15. An airbag arrangement for protecting an occupant of a front passenger seat of a vehicle, the arrangement comprising:
   an inflatable first cushion connected to an inflatable second cushion;
   wherein each of the first cushion and the second cushion is formed by symmetric front and back panels;
   wherein the front panel of the first cushion is connected to the back panel of the second cushion along a closed non-peripheral seam;
   wherein the seam surrounds a flow passage between the first cushion and second cushion; and
   wherein the first cushion includes an opening for allowing gas to be provided to the first cushion for inflating the first and second cushions, and wherein the second cushion deploys to a position adjacent the occupant but not in contact with a windshield and wherein the first cushion deploys to a position between the second cushion and the windshield to thereby provide support for the second cushion by abutting the windshield.

16. The airbag arrangement of claim 15, wherein the back panel of the second cushion includes an opening that overlies with a front panel of the first cushion to thereby form the flow passage.

17. The airbag arrangement of claim 16, wherein the flow passage includes a check valve to prevent gas from flowing from the second chamber into the first chamber.

18. The airbag arrangement of claim 17, wherein the front panel of the second cushion is connected to the back panel of the second cushion by a tether that is located in the interior of the cushion.

19. The airbag arrangement of claim 17, wherein the front and back panels in each of the first cushion and the second cushion are connected together by a peripheral seam.

20. The airbag arrangement of claim 17, wherein the front panel of the first cushion and the back panel of the second cushion are different shapes.

* * * * *